United States Patent
Bae et al.

(10) Patent No.: US 10,162,238 B2
(45) Date of Patent: Dec. 25, 2018

(54) DISPLAY DEVICE

(71) Applicant: Samsung Display Co., Ltd., Yongin-si, Gyeonggi-do (KR)

(72) Inventors: Kwang Soo Bae, Suwon-si (KR); Min Jeong Oh, Incheon (KR); Hae Ju Yun, Hwaseong-si (KR); Dae Ho Song, Hwaseong-si (KR); Taimei Kodaira, Hwaseong-si (KR); Yu Jin Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 228 days.

(21) Appl. No.: 15/052,742

(22) Filed: Feb. 24, 2016

(65) Prior Publication Data

US 2016/0259223 A1    Sep. 8, 2016

(30) Foreign Application Priority Data

Mar. 2, 2015    (KR) .......................... 10-2015-0028967

(51) Int. Cl.
*G02F 1/1339*    (2006.01)
*G02F 1/1362*    (2006.01)
(Continued)

(52) U.S. Cl.
CPC ...... *G02F 1/136286* (2013.01); *G02F 1/1341* (2013.01); *G02F 1/1368* (2013.01);
(Continued)

(58) Field of Classification Search
CPC ......... G02F 1/136286; G02F 1/133377; G02F 1/133707
(Continued)

(56) References Cited

U.S. PATENT DOCUMENTS 6,462,798 B1 * 10/2002 Kim .................. G02F 1/133345
349/129
8,169,579 B2    5/2012 Kim
(Continued)

FOREIGN PATENT DOCUMENTS

KR    10-2013-0124827 A    11/2013
KR    10-2014-0003848 A    10/2014
KR    10-2014-0122884 A    10/2014

OTHER PUBLICATIONS

European Search Report, European Appln. No. 16157845.5, dated Nov. 3, 2016, pp. 1-11.
(Continued)

*Primary Examiner* — Lucy Chien
(74) *Attorney, Agent, or Firm* — Innovation Counsel LLP

(57) ABSTRACT

A display device according to an exemplary embodiment of the present inventive concept includes: a substrate; a data line and a thin film transistor disposed on the substrate; a common electrode and a pixel electrode disposed on the thin film transistor and overlapping each other by interposing an insulating layer therebetween; a roof layer formed to be separated from the pixel electrode and the common electrode while interposing a microcavity therebetween and having an injection hole partially exposing the microcavity; a liquid crystal layer filling the microcavity; an overcoat formed on the roof layer to cover the injection hole and sealing the microcavity. The pixel electrode includes an auxiliary electrode that is formed on the data line, the auxiliary electrode overlapping and being insulated from the data line.

20 Claims, 22 Drawing Sheets

(51) Int. Cl.
*G02F 1/1368* (2006.01)
*G02F 1/1333* (2006.01)
*G02F 1/1341* (2006.01)
*G02F 1/1343* (2006.01)
*G02F 1/1337* (2006.01)

(52) U.S. Cl.
CPC .. *G02F 1/133377* (2013.01); *G02F 1/133707* (2013.01); *G02F 1/134309* (2013.01); *G02F 1/134363* (2013.01); *G02F 1/133711* (2013.01); *G02F 1/136209* (2013.01); *G02F 2001/134318* (2013.01); *G02F 2201/122* (2013.01); *G02F 2201/128* (2013.01); *G02F 2201/40* (2013.01)

(58) Field of Classification Search
USPC .......................................................... 349/156
See application file for complete search history.

(56) References Cited

U.S. PATENT DOCUMENTS

2003/0107687 A1* 6/2003 Choo ................ G02F 1/133707
349/39
2014/0160419 A1* 6/2014 Lee ....................... G02F 1/1341
349/154

OTHER PUBLICATIONS

European Search Report corresponding to EP 16157845.5, dated Aug. 1, 2016, 7 pages.

\* cited by examiner

DISPLAY DEVICE

CROSS-REFERENCE TO RELATED APPLICATION

This application claims priority to and the benefit of Korean Patent Application No. 10-2015-0028967 filed in the Korean Intellectual Property Office on Mar. 2, 2015, the entire contents of which are incorporated herein by reference.

BACKGROUND (a) Field

The present inventive concept relates to a display device.

(b) Description of the Related Art

Presently one of the most widely used flat panel displays, a liquid crystal display (LCD) includes two sheets of display panels formed with field generating electrodes and a liquid crystal layer interposed therebetween. The LCD displays an image by generating an electric field on a liquid crystal layer by applying a voltage to the field generating electrodes, determining alignment directions of liquid crystal molecules of the liquid crystal layer by the generated field, and controlling polarization of incident light.

The two sheets of display panels included in the LCD may be a thin film transistor array panel and an opposed display panel. In the thin film transistor array panel, gate lines for transmitting a gate signal and data lines for transmitting a data signal are formed to cross each other, and thin film transistors connected to the gate and data lines, as well as pixel electrodes connected to the thin film transistors, may be formed. Light blocking members, color filters, common electrodes, and the like may be formed in the opposed display panel. In some embodiments, the light blocking members, the color filters, and the common electrodes may be formed in the thin film transistor array panel.

However, in conventional LCDs, since two substrates are required and components are respectively formed on the two substrates, the display device not only becomes heavy, thick, and costly, but also a long processing time is required.

The above information disclosed in this Background section is only to enhance the understanding of the background of the inventive concept and therefore it may contain information that does not form the prior art.

SUMMARY

The present inventive concept has been made in an effort to provide a display device and a manufacturing method thereof that can reduce a thickness, a width, a cost, and a processing time by manufacturing the display device using one substrate.

In addition, the present inventive concept has been made in an effort to provide a display device and a manufacturing method thereof that can solve such problems as light leakage or transmittance deterioration generated at edges of a microcavity.

An exemplary embodiment of the present inventive concept provides a display device including: a substrate; a data line and a thin film transistor disposed on the substrate; a common electrode and a pixel electrode disposed on the thin film transistor and overlapping each other by interposing an insulating layer therebetween; a roof layer formed to be separated from the pixel electrode and the common electrode while interposing a microcavity therebetween and having an injection hole partially exposing the microcavity; a liquid crystal layer filling the microcavity; an overcoat formed on the roof layer to cover the injection hole and sealing the microcavity. The pixel electrode includes an auxiliary electrode that is formed on the data, the auxiliary electrode overlapping and being insulated from the data line.

The auxiliary electrode may be formed on each of two data lines at opposite edges of one pixel electrode.

The auxiliary electrode may be formed on one data line at one edge of one pixel electrode.

A width of the auxiliary electrode may be narrower than that of the data line.

A width of the auxiliary electrode may be wider than that of the data line.

Two auxiliary electrodes connected to two pixel electrodes on the single data line at opposite sides thereof may be formed to be separated from each other.

The data line may include curved portions, and the curved portions may meet each other in a middle region of a pixel area to form a V-shape.

The roof layer may cover top and opposite lateral surfaces of the microcavity, the roof layer covering the lateral surfaces of the microcavity may function as a partition wall, and the partition wall may include a curved portion that is curved at the same angle as the data line.

The pixel electrode may have a plurality of cutouts, and the plurality of cutouts may include a first portion forming a first angle with a reference line perpendicular to the gate line and a second portion forming a second angle, which is different from the first angle, with the reference line, and a plurality of branch electrodes divided by the plurality of cutouts may be included.

A display device according to another exemplary embodiment of the present inventive concept includes: a substrate; a data line and a thin film transistor disposed on the substrate; a common electrode and a pixel electrode disposed on the thin film transistor and overlapping each other by interposing an insulating layer therebetween; a roof layer formed to be separated from the pixel electrode and the common electrode while interposing a microcavity therebetween and having an injection hole partially exposing the microcavity; a liquid crystal layer filling the microcavity; an overcoat formed on the roof layer to cover the injection hole and sealing the microcavity. The pixel electrode includes curved portions that meet each other in a middle region of a pixel area to form a V-shape, and the data line is formed to be straight.

The roof layer may cover top and opposite lateral surfaces of the microcavity, and the roof layer covering the lateral surfaces of the microcavity may function as a partition wall, and the partition wall may be formed to be straight in the same direction as the data line.

The pixel electrode may include terminal end protruding portions formed at upper and lower edges of one lateral surface of the pixel electrode, and a center protruding portion formed at a center of the other lateral surface of the pixel electrode.

The pixel electrode may have a plurality of cutouts, and the plurality of cutouts may include a first portion forming a first angle with a reference line perpendicular to the gate line and a second portion forming a second angle with the reference line, which is different from the first angle, and a plurality of branch electrodes divided by the plurality of cutouts may be included.

An imaginary line connecting four respective corners of the pixel electrode may have a rectangular shape, and the pixel electrode may be completely included within the imaginary rectangle.

A distance between an end of the pixel electrode and the data line may be constantly maintained at opposite edges of the pixel electrode.

An alignment layer coated inside the microcavity may be included, and an alignment direction of the alignment layer and an extending direction of the data line may be parallel to each other.

A display device according to another exemplary embodiment of the present inventive concept includes: a substrate; a data line and a thin film transistor disposed on the substrate; a common electrode and a first pixel electrode disposed on the thin film transistor and overlapping each other by interposing an insulating layer therebetween; a roof layer formed to be separated from the first pixel electrode and the common electrode while interposing a microcavity therebetween and having an injection hole partially exposing the microcavity, the roof layer including a partition wall formed between adjacent microcavities; a liquid crystal layer filling the microcavity; an overcoat formed on the roof layer to cover the injection hole and sealing the microcavity, wherein the first pixel electrode includes a first auxiliary electrode that is formed on the data line to overlap the data line, and wherein the first auxiliary electrode overlaps the partition wall.

The partition wall may have a top surface and a bottom surface, the top surface being wider than the bottom surface, and wherein the first auxiliary electrode may completely overlap a width direction of the bottom surface.

The display device may further include a second pixel electrode having a second auxiliary electrode and formed adjacent to the first pixel electrode with the data line interposed therebetween, wherein the second auxiliary electrode overlaps the partition wall.

The auxiliary electrode and the second auxiliary electrode may be electrically disconnected from each other.

As described above, in the LCD according to the exemplary embodiment of the present inventive concept, the transmittance deterioration generated at the edge regions of the microcavity by the difference in thickness can be prevented, as well as the defect of leakage of light resulting from the partition wall and the alignment layer being differently extended and aligned.

DETAILED DESCRIPTION OF THE EMBODIMENTS

Figure 1:
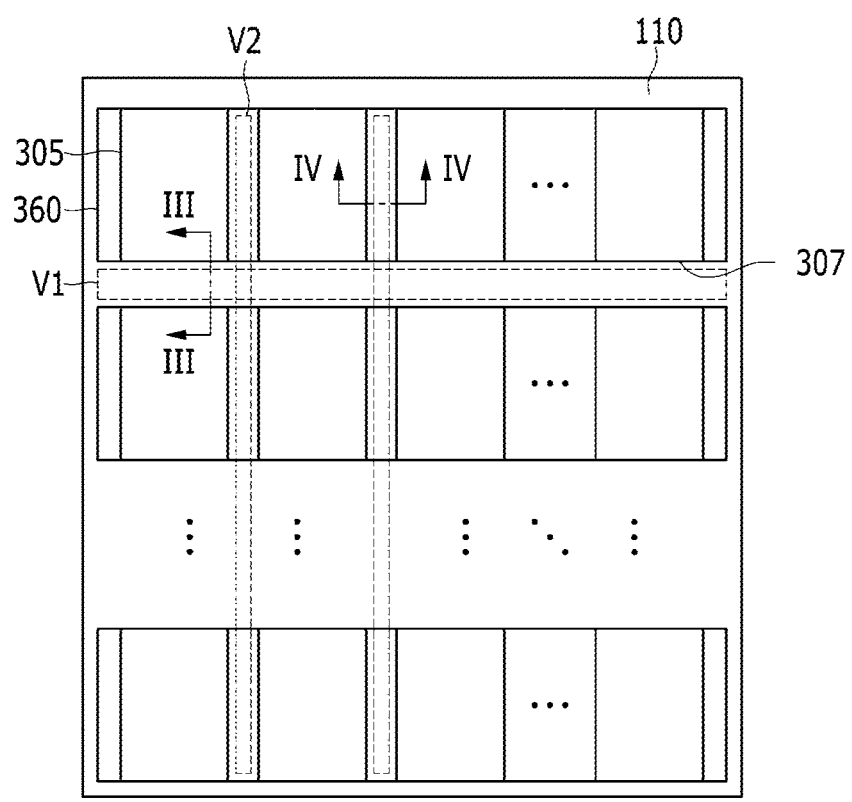
FIG. 1 is a top plan view of a display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc. are exaggerated for clarity. Like reference numerals designate like elements throughout the specification. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present.

A display device according to an exemplary embodiment of the present inventive concept will now be described in detail with reference to the drawings.

First, referring to FIG. 1, a display device according to an exemplary embodiment of the present inventive concept will be schematically described as follows.

FIG. 1 is a top plan view of the display device according to the exemplary embodiment of the present inventive concept.

The display device according to the exemplary embodiment of the present inventive concept includes a substrate 110 that is made of glass or plastic.

Microcavities 305 covered by roof layers 360 are formed on the substrate 110. The roof layers 360 extend in a row direction, and a plurality of microcavities 305 are formed under one roof layer 360.

The microcavities 305 may be arranged in a matrix form, a first valley V1 is located between the microcavities 305 that neighbor in a column direction, and a second valley V2 is located between the microcavities 305 that neighbor in the row direction.

A plurality of roof layers 360 are separated while interposing the first valleys V1 therebetween. Instead of being covered by the roof layer 360, the microcavities 305 may be exposed to the outside at portions where the first valley V1 is formed. These are referred to as injection holes 307. The injection holes 307 are formed at one edge or opposite edges of the microcavity 305.

Each of the roof layers 360 formed between the adjacent second valleys V2 is separated from the substrate 110, thereby forming the microcavities 305. That is, the roof layer 360 is formed not to cover a first edge side where the injection hole 307 is formed, but to cover the rest of the edge sides thereof. Accordingly, the roof layer 360 includes a side wall formed on three edge sides other than the first edge side, and a top surface covering the side wall. Hereinafter, the edge side located at the edge facing the injection hole 307 may be referred to as a horizontal support member, while the edge sides located at the edges coupled with the horizontal support member to form the side wall may be referred to as a vertical support member.

The aforementioned structure of the display device according to the exemplary embodiment of the present inventive concept is only for exemplary purposes, so numerous variations may be possible. For example, arrangement of the microcavity 305, the first valley V1, and the second valley V2 may be changed, a plurality of roof layers 360 may be connected to each other in the first valley V1, and each of the roof layers 360 is formed in the second valley V2 to be partially separated from the substrate 110, so the adjacent microcavities 305 may be connected to each other.

The display device according to the exemplary embodiment of the present inventive concept will now be described in detail with reference to FIGS. 2 to 4.

Figure 2:
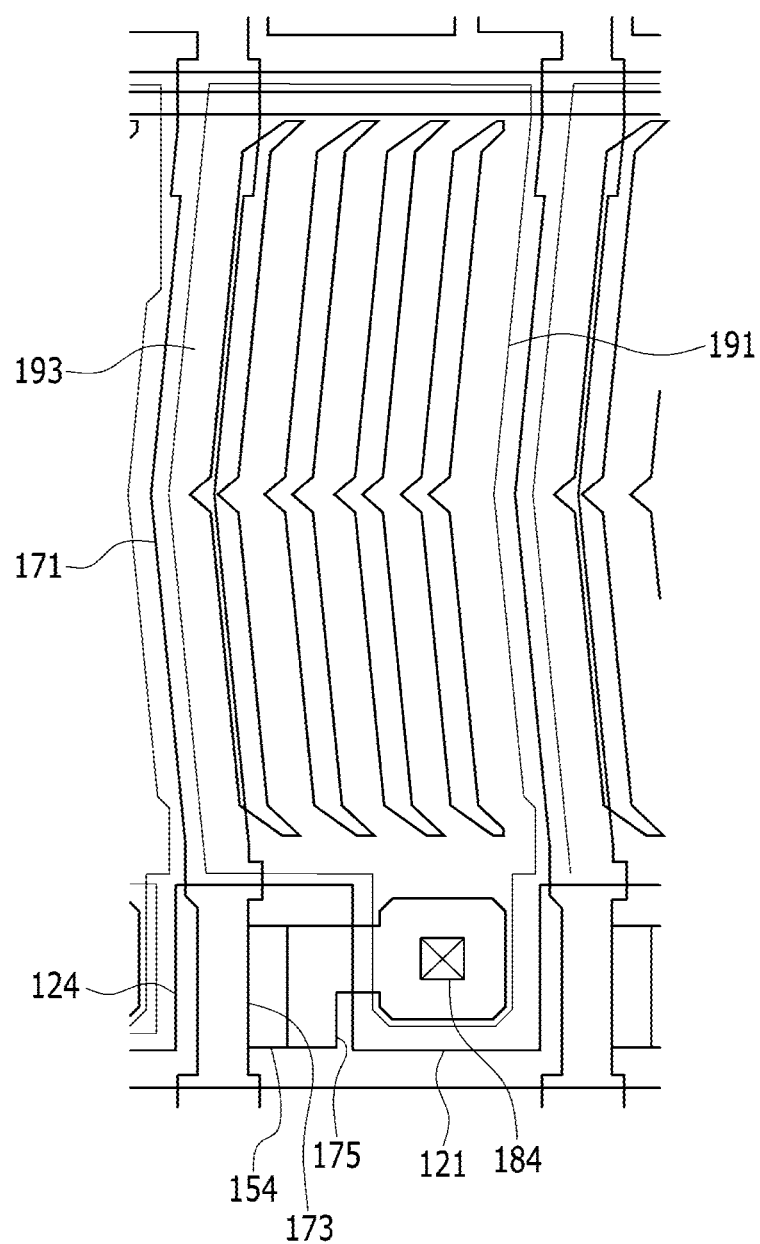
FIG. 2 is a layout view of one pixel according to the exemplary embodiment of the present inventive concept.

FIG. 2 is a layout view of one pixel according to the exemplary embodiment of the present inventive concept. FIG. 3 is a cross-sectional view of the display device of FIG. 1 taken along the line FIG. 4 is a cross-sectional view of the display device of FIG. 1 taken along the line IV-IV.

Referring to FIG. 2, a gate conductor including a gate line 121 is formed on the insulation substrate 110 that is made of transparent glass or plastic.

The gate line 121 includes a gate electrode 124, and a wide end portion (not shown) for connection with another layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), etc. However, the gate line 121 may have a multilayer structure in which at least two conductive layers having different physical properties are included.

A gate insulating layer 140 that is made of a silicon nitride ($SiN_x$) or a silicon oxide ($SiO_x$) is formed on the gate line 121. The gate insulating layer 140 may have a multilayer structure in which at least two insulating layers having different physical properties are included.

A semiconductor 154 made of amorphous silicon or polysilicon is formed on the gate insulating layer 140. The semiconductor 154 may include an oxide semiconductor.

Ohmic contacts (not shown) are formed on the semiconductor 154. The ohmic contacts (not shown) may be made of a material such as n+ hydrogenated amorphous silicon for nMOS type thin film transistor, in which an n-type impurity such as phosphorus is doped at a high concentration, p+ hydrogenated amorphous silicon for pMOS type thin film transistor, in which an p-type impurity such as boron is doped at a high concentration, or silicide. The ohmic contacts (not shown) may be paired to be disposed on the semiconductor 154. When the semiconductor 154 is an oxide semiconductor, the ohmic contacts may not be included.

A data line 171 including a source electrode 173 and a data conductor including a drain electrode 175 are formed on the semiconductor 154 and the gate insulating layer 140.

The data line 171 includes a wide end portion (not shown) for connection with another layer or an external driving circuit. The data line 171 transmits a data signal, and substantially vertically extends to cross the gate line 121.

In this case, the data line 171 may have a first curved portion that is curved to obtain a maximum transmittance of the LCD, and curved portions may meet each other in a middle region of the pixel area to form a V-shape. The middle region of the pixel area may further include a second curved portion (not shown) that is curved to form a predetermined angle with the first curved portion.

The first curved portion of the data line 171 may be curved to form an angle of about 7° with a vertical reference line that forms an angle of 90° with a direction in which the gate line 121 extends. The second curved portion disposed in the middle region of the pixel area may be further curved to form an angle of about 7° to about 15° with the first curved portion.

The source electrode 173 is a part of the data line 171, and is disposed on the same line as the data line 171. The drain electrode 175 is formed to extend parallel to and be opposite to the source electrode 173. Therefore, the drain electrode 175 is parallel to part of the data line 171.

The gate electrode 124, the source electrode 173, and the drain electrode 175 form one thin film transistor (TFT) along with the semiconductor 154, and a channel of the TFT is formed in the semiconductor 154 between the source electrode 173 and the drain electrode 175.

Since the display device according to the exemplary embodiment of the present inventive concept includes the source electrode 173 disposed on the same line as the data line 171 and the drain electrode 175 extending parallel to the data line 171, a channel width of the thin film transistor can be increased even without increasing an area taken by the data conductor, and as a result, the aperture ratio of the display device can be increased.

However, in the case of a display device according to another exemplary embodiment of the present inventive concept, the source electrode 173 and the drain electrode 175 may have different shapes.

The data line 171 and the drain electrode 175 may be preferably formed of a refractory metal such as molybdenum, chromium, tantalum, titanium, etc. or an alloy thereof, and may have a multilayer structure in which a refractory metal layer (not shown) and a low resistance conductive layer (not shown) are included. Examples of the multilayer structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer. However, the data line 171 and the drain electrode 175 may be formed of various metals or conductors other than the aforementioned metals.

A passivation layer 180 is disposed on the data conductors 171, 173, and 175, the gate insulating layer 140, and the exposed semiconductor 154. The passivation layer 180 may be made of an organic insulating material or an inorganic insulating material.

A color filter 230 is formed on the passivation layer 180 in each pixel area PX. Each color filter 230 may display one of three primary colors, such as red, green, and blue. The color filter 230 may also display cyan, magenta, yellow, and white-based colors without being limited to displaying the three primary colors of red, green, and blue. Unlike as shown in the drawings, the color filter 230 may extend further along the data lines 171 between the neighboring data lines 171 in the column direction.

An organic layer 240 is disposed on the color filter 230. The organic layer 240 may be thicker than the passivation layer 180 and have a surface which is smoother than that of the passivation layer 180.

The organic layer 240 may be disposed on a display area where a plurality of pixels are disposed, while not being disposed on a peripheral area where a gate pad portion or a data pad portion is formed. Alternatively, the organic layer 240 may be disposed on the peripheral area where the gate pad portion or the data pad portion is formed.

A contact hole 184 may be formed through the organic layer 240, the color filter 230, and the passivation layer 180.

A common electrode 270 is disposed on the organic layer 240. The common electrode 270 may have a planar shape, and may be disposed in the display area where the plurality of pixels are disposed, but not in the peripheral area where the gate pad portion or the data pad portion is formed.

The common electrode 270 is made of a transparent conductive layer such as ITO or IZO.

An insulating layer 250 is disposed on the common electrode 270. The insulating layer 250 may be made of an inorganic insulating material, such as a silicon nitride ($SiN_x$), a silicon oxide ($SiO_x$), a silicon oxynitride ($SiO_xN_y$), etc. The insulating layer 250 serves to protect the color filter 230 and the like that are made of an organic material or to insulate the common electrode 270 and a pixel electrode 191. That is, even if the common electrode 270 is formed to overlap the pixel electrode 191, the common electrode 270 and the pixel electrode 191 may be prevented from being short-circuited by contacting each other, since the insulating layer 250 is formed on the common electrode 270.

The pixel electrode 191 is disposed on the insulating layer 250. The pixel electrode 191 includes a curved edge that is almost parallel to the first and second curved portions of the data line 171.

Referring to FIG. 2, the pixel electrode 191 includes a plurality of branch electrodes that are divided by a plurality of openings, and some of the branch electrodes of the pixel electrode are formed above a region where the data line 171 is formed. The branch electrode formed above the data line 171 is referred to as an auxiliary electrode 193.

As shown in FIG. 2, the auxiliary electrode 193 is formed to overlap the region above the data line 171. FIG. 2 illustrates that the auxiliary electrode 193 is formed only on the data line at a left side of the pixel electrode 191, but the auxiliary electrode 193 may be formed on the data line at a right side of the pixel electrode 191, too.

In addition, the auxiliary electrode 193 may be formed to have a width wider than the data line 171. In FIG. 2, one auxiliary electrode 193 is formed on one data line 171, but in another exemplary embodiment of the present inventive concept, the auxiliary electrodes 193 of the neighboring pixels may be respectively formed on one data line 171. In this case, the auxiliary electrodes 193 of the respective pixels do not contact each other because they are separated from each other while maintaining a predetermined width therebetween.

Figure 4:
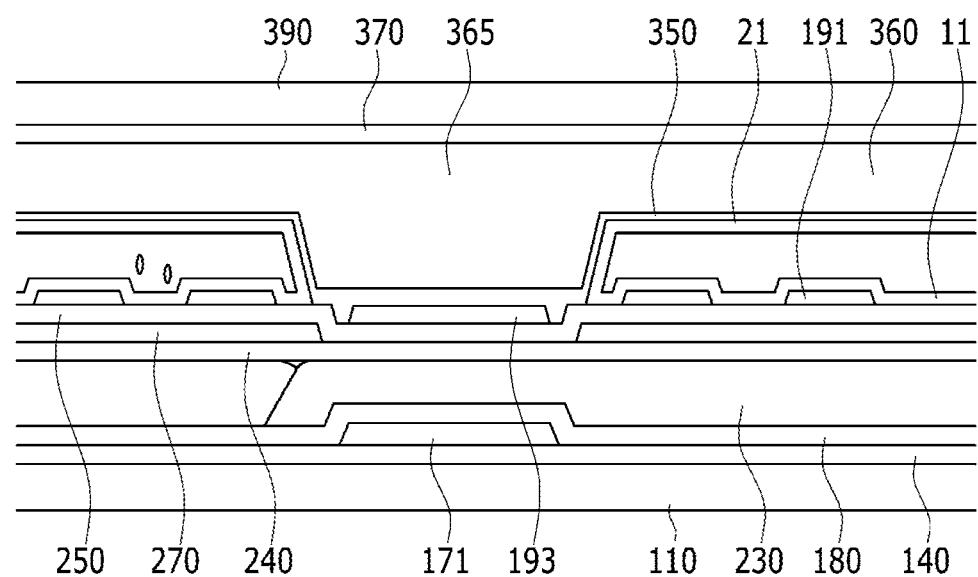
FIG. 4 is a cross-sectional view of the display device of FIG. 1 taken along the line IV-IV.

That is, as shown in FIG. 4, one auxiliary electrode 193 may be formed on one data line 171.

Figure 5:
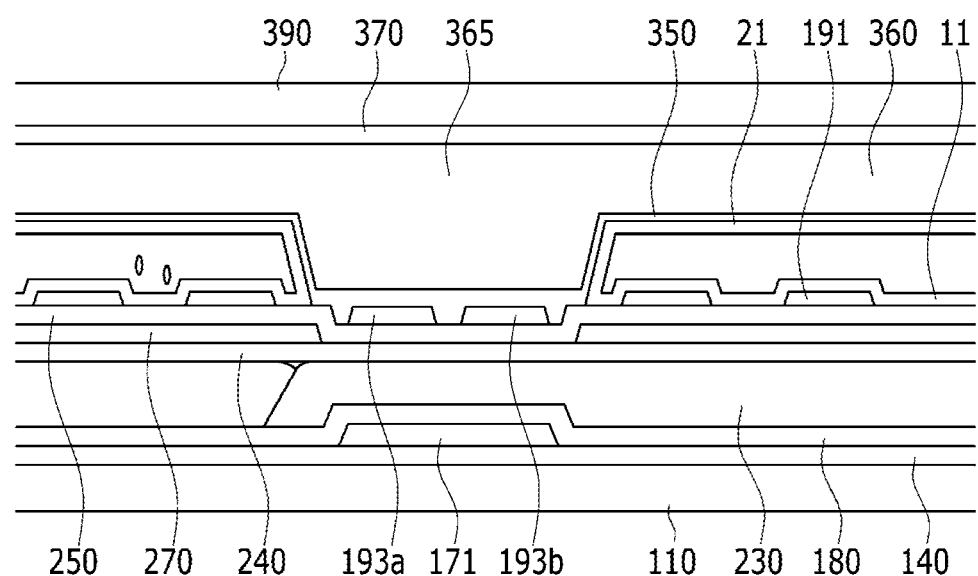
FIG. 5 is a cross-sectional view of a display device according to another exemplary embodiment of the present inventive concept that illustrates the same cross-section as in FIG. 4.

Alternatively, as shown in FIG. 5, two auxiliary electrodes 193a and 193b may be formed on one data line 171. In this case, one auxiliary electrode 193a is connected to one pixel electrode, while the other auxiliary electrode 193b is connected to the other pixel electrode adjacent to the one pixel electrode. That is, the two auxiliary electrodes connected to the pixel electrodes of the respective neighboring pixels are present on the data line such that they are parallel to and electrically disconnected from each other.

The auxiliary electrodes 193, which will be described later, may eliminate a problem of a decrease in transmittance in the display device where a horizontal electric field is generated by a difference in thickness between the microcavities. A specific shape and effect thereof will be described later.

The pixel electrode 191 is made of a transparent conductive layer such as ITO or IZO.

The pixel electrode 191 is physically and electrically connected to the drain electrode 175 through the contact hole 184 formed in the organic layer 240, the color filter 230, and the passivation layer 180, such that a voltage from the drain electrode 175 is applied to the pixel electrode 191.

A data voltage from the drain electrode 175 is applied to the pixel electrode 191, and a constant reference voltage from a reference voltage application unit disposed outside of the display area is applied to the common electrode 270.

The pixel electrode 191 and the common electrode 270 generate an electric field according to the applied voltages, and liquid crystal molecules of a liquid crystal layer 310 disposed between the two electrodes 191 and 270 rotate in a direction parallel to the electric field. Depending on a rotating direction of the liquid crystal molecules determined as described above, polarization of light transmitted through the liquid crystal layer is changed.

A lower insulating layer 350 may be further formed on the pixel electrode 191 such that it is separated from the pixel electrode 191 while maintaining a constant distance therefrom. The lower insulating layer 350 may be made of an inorganic insulating material, such as a silicon nitride ($SiN_x$), a silicon oxide ($SiO_x$), etc.

The microcavity 305 is formed between the pixel electrode 191 and the lower insulating layer 350. That is, the microcavity 305 is enclosed by the pixel electrode 191 and the lower insulating layer 350. A width and size of the microcavity 305 may be variously modified depending on a size and resolution of the display device.

A first alignment layer 11 is formed on the pixel electrode 191. The first alignment layer 11 may be formed right on the lower insulating layer 350 that is not covered by the pixel electrode 191.

A second alignment layer 21 is formed below the lower insulating layer 350 to face the first alignment layer 11.

The first and second alignment layers 11 and 21 may be formed as vertical alignment layers, and may be made of an aligning material, such as polyamic acid, polysiloxane, polyimide, etc. The first and second alignment layers 11 and 21 may be connected to each other at the edge of the pixel area PX, as shown in FIG. 3.

The liquid crystal layer including the liquid crystal molecules 310 is formed in the microcavity 305 that is disposed between the pixel electrode 191 and the lower insulating layer 350.

Figure 3:
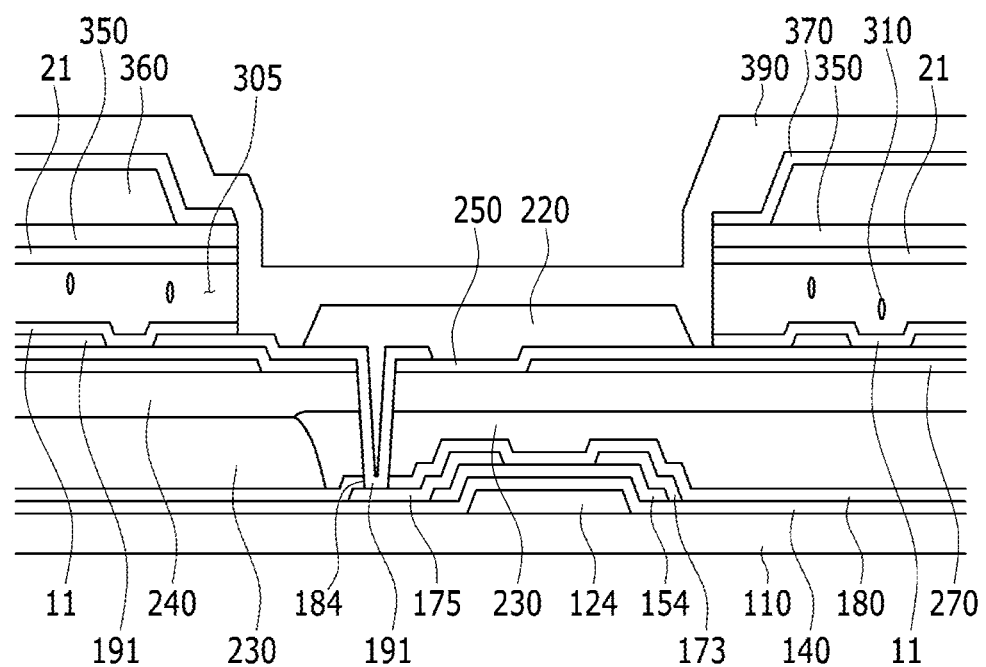
FIG. 3 is a cross-sectional view of the display device of FIG. 1 taken along the line III-III.

In addition, a light blocking member 220 is formed between the neighboring color filters 230, and may be disposed, as shown specifically in FIG. 3, on the pixel electrode 191 and on the insulating layer 250 not covered by the pixel electrode. The light blocking member 220 may prevent light leakage since it is formed at the edge of the pixel area PX and on the thin film transistor.

The light blocking member 220 extends along the gate line 121. The light blocking member may be formed only in the first valley V1, and not in the second valley V2.

Next, a roof layer 360 is formed on the lower insulating layer 350. The roof layer 360 may be made of an organic material. The microcavity 305 is formed under the roof layer 360 and the roof layer 360 is hardened by a curing process, thereby allowing the microcavity 305 to maintain its shape. The roof layer 360 is formed to be separated from the pixel electrode 191 while interposing the microcavity 305 therebetween.

The roof layer 360 is formed in each pixel area PX and in the second valley V2, but not in the first valley V1. In the second valley V2, the microcavity 305 is not formed under the roof layer 360. Accordingly, the roof layer 360 disposed in the second valley V2 may have a greater thickness than the roof layer 360 disposed in the pixel area. A region where the roof layer 360 is formed thicker is referred to as a partition wall 365.

Top and opposite lateral surfaces of the microcavity 305 are formed such that they are covered by the roof layer 360.

The injection hole 307 is formed along a first valley V1 in the roof layer 360 to partially expose the microcavity 305. The lower insulating layer 350 adjacent to where the injection hole 307 is formed may include a portion that protrudes further than the roof layer 360.

The injection hole 307 according to the exemplary embodiment of the present inventive concept may be formed at one edge of the pixel area PX. For example, the injection hole 307 may be formed such that it exposes one surface of the microcavity 305 in accordance with a lower side of the pixel area PX. On the contrary, the injection hole 307 may be formed along an upper side of the pixel area PX.

In addition, as shown in FIG. 3, the injection holes 307 may be respectively formed in the upper and lower sides of one pixel area.

The injection hole 307 may be formed at one of two opposite edges of the respective microcavities 305 or both edges thereof.

Since the microcavity 305 is exposed by the injection hole 307, an aligning agent or a liquid crystal material may be injected into the microcavity 305 through the injection hole 307.

An upper insulating layer 370 may be further formed on the roof layer 360. The upper insulating layer 370 may be made of an inorganic insulating material such as a silicon nitride ($SiN_x$), a silicon oxide ($SiO_x$), etc. The upper insulating layer 370 may be formed to cover the top and lateral surfaces of the roof layer 360. The upper insulating layer 370 serves to protect the roof layer 360 that is made of an organic material, and may be omitted if necessary.

The upper insulating layer 370 may contact the lower insulating layer 350 that protrudes further than the roof layer 360 in a region where the injection hole 307 is located, as shown in FIG. 3. In addition, the upper insulating layer 370 may have a stepped cross-section that is associated with a step between a region contacting the lower insulating layer 350 and a region covering the roof layer.

An overcoat 390 may be formed on the upper insulating layer 370. The overcoat 390 is formed to cover the injection hole 307 that partially exposes the microcavity 305 to the outside. That is, the overcoat 390 may seal the microcavity 305 such that the liquid crystal molecules 310 formed inside the microcavity 305 are not discharged to outside. The overcoat 390 may be desirably made of a material that does not react with the liquid crystal molecules 310 because it contacts the liquid crystal molecules 310. For example, the overcoat 390 may be made of parylene and the like.

The overcoat 390 may be multilayer film, such as a dual layer, a triple layer, etc. The dual layer is composed of two layers that are made of different materials. The triple layer is composed of three layers, in which adjacent layers are respectively made of different materials. For example, the overcoat 390 may include a layer made of an organic insulating material, and a layer made of an inorganic insulating material.

Though not illustrated, polarizers may be further formed on top and bottom surfaces of the display device. The polarizer may include a first polarizer and a second polarizer. The first polarizer may be attached to the bottom surface of the substrate 110, while the second polarizer may be attached onto the overcoat 390.

A shape of an auxiliary electrode of a display device according to an exemplary embodiment of the present inventive concept and its effect thereof will now be described in detail with reference to FIGS. 6 to 14.

Figure 6:
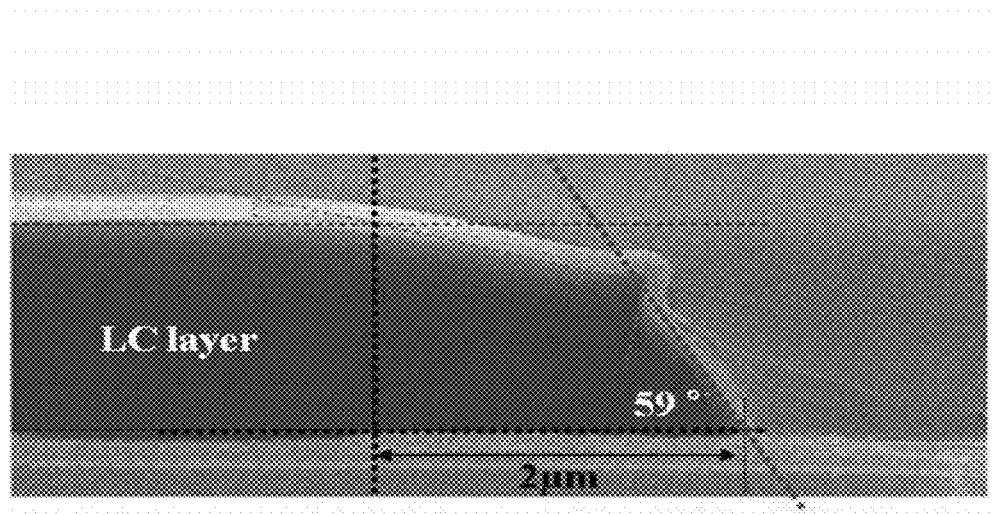
FIG. 6 illustrates a cross-section of a microcavity and a roof layer in the display device according to the exemplary embodiment of the present inventive concept.

FIG. 6 illustrates a cross-section of the microcavity and the roof layer in the display device according to the exemplary embodiment of the present inventive concept.

Referring to FIG. 6, an edge of the microcavity separated by a partition wall is not vertically formed, but is inclined at a predetermined angle. Accordingly, the microcavity has an edge portion that is smaller in thickness than a center portion.

Such edge inclination of the microcavity is indispensable in a manufacturing process of the microcavity, and such a tapered edge causes the microcavity to have different thicknesses, and such differences in thickness result in transmittance deterioration.

That is, the microcavity is configured to have an optimal thickness for transmittance in consideration of a composition of the liquid crystals, the applied voltage, and the like, and there has been a problem in that the transmittance deteriorates as the edge of the microcavity has a thickness that deviates from such an optimal thickness.

However, in the display device according to the exemplary embodiment of the present inventive concept, an electric field applied to liquid crystals around the partition wall is increased by forming an auxiliary electrode in a region above a data line. Accordingly, the voltage applied to liquid crystals, which is a factor in influencing transmittance, can be adjusted to minimize transmittance reduction even if the microcavity has the edge with the reduced thickness.

Figure 7:
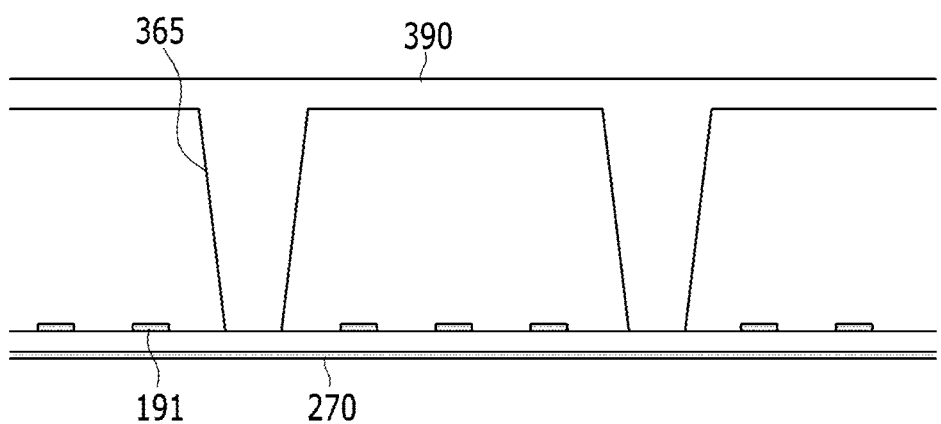
FIG. 7 illustrates a cross-section of a display device according to a comparative example of the present inventive concept.
Figure 8:
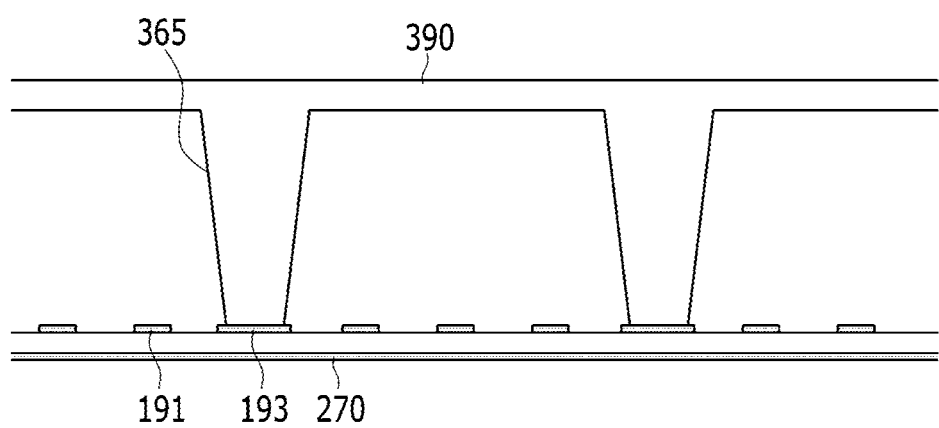
FIG. 8 illustrates a cross-section of the display device according to the exemplary embodiment of the present inventive concept.

FIG. 7 illustrates a cross-section of a display device according to a comparative example of the present inventive concept. FIG. 8 illustrates a cross-section of the display device according to the exemplary embodiment of the present inventive concept.

Referring to FIG. 7, in the case of the display device according to the comparative example of the present inventive concept, a pixel electrode is not formed on a region where a partition wall 365 is formed. In addition, since a microcavity is formed to have a slanted surface at its edge portion, the microcavity has a smaller thickness at its edge than in its center portion. The display device having such a structure has a problem in that transmittance decreases at the edge portion of the microcavity, as previously described.

However, referring to FIG. 8, in the case of the display device according to the exemplary embodiment of the present inventive concept, the auxiliary electrode 193 is formed under the region where the partition wall 365 is formed. In FIG. 8, the auxiliary electrode 193 is illustrated such that it has a wider width than the partition wall 365, but the auxiliary electrode 193 may be formed to have a narrower width than the partition wall 365. In addition, the auxiliary electrodes 193 of the two adjacent pixels may be present while separated from each other under one partition wall 365. In the case of the display device having such a structure, the voltage applied by the auxiliary electrode 193 to the liquid crystal layer at the edge of the microcavity can be controlled. That is, an electric field is generated at edges of the liquid crystal layer to compensate a transmittance loss at the edge of the microcavity that is caused by a height difference.

An effect of the display device according to the exemplary embodiment of the present inventive concept will now be described with reference to experimental results.

Figure 9:
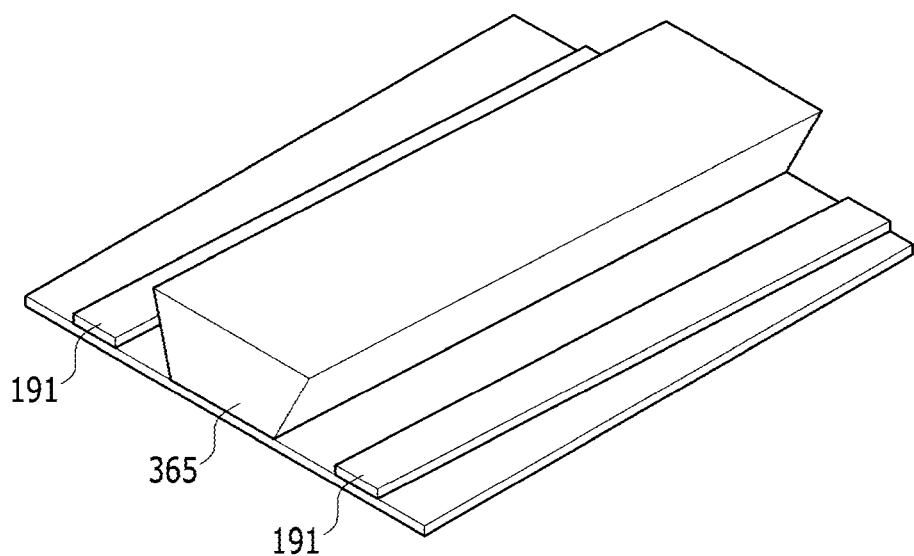
FIG. 9 is a schematic three-dimensional (3D) view of a partition wall, a pixel electrode, and an auxiliary electrode in the display device according to the exemplary embodiment of the present inventive concept.

FIG. 9 is a schematic three-dimensional (3D) view of a partition wall, a pixel electrode, and an auxiliary electrode in the display device according to the exemplary embodiment of the present inventive concept.

Figure 10A:
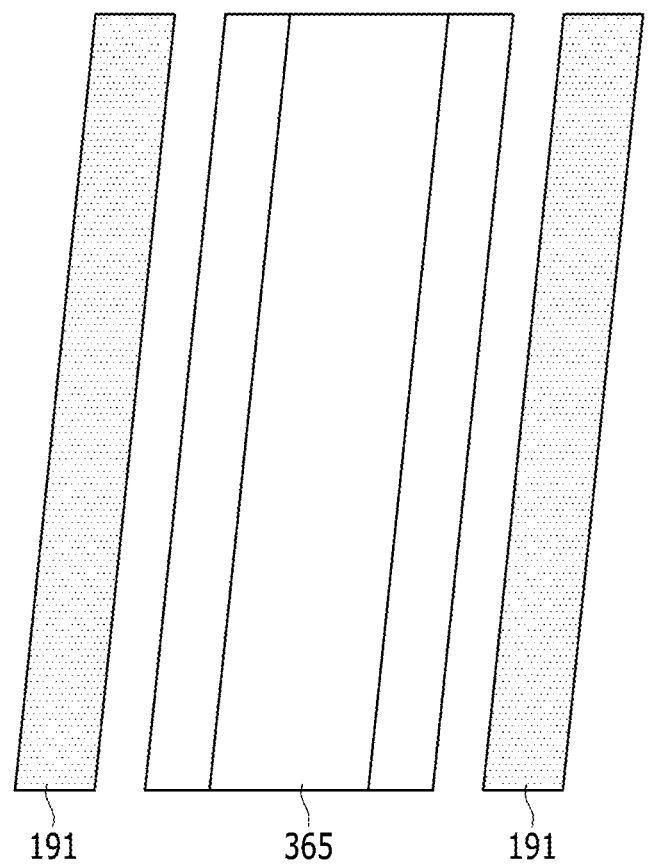
FIG. 10A illustrates a layout view of the display device of FIG. 9 viewed from the bottom in the display device according to the comparative example of the present inventive concept.
Figure 10B:
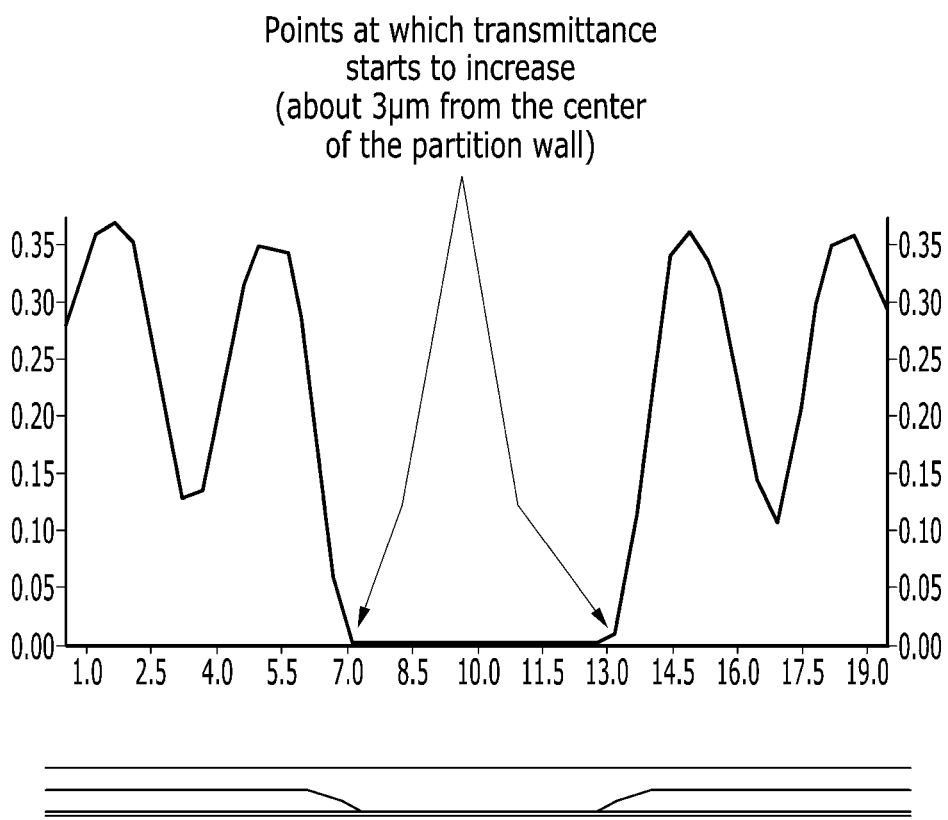
FIG. 10B illustrates measurement results of transmittance of the display device.

FIG. 10A illustrates a layout view of the display device of FIG. 9 viewed from the bottom in the display device according to the comparative example of the present inventive concept, and FIG. 10B illustrates measurement results of transmittance of the display device.

Referring to FIG. 10A, in the display device according to the comparative example of the present inventive concept, the auxiliary electrode is not formed under the partition wall 365. In addition, as shown in FIG. 10A and FIG. 9, a lateral surface of the partition wall is inclined in a predetermined angle, and as a result, the microcavity around the partition wall also has a lateral surface that is inclined at the predetermined angle. Accordingly, as previously described, such an inclination causes the microcavity to have uneven thicknesses and the transmittance to decrease at the edge.

FIG. 10B illustrates the measurement results of transmittance in the display device according to the comparative example of the present inventive concept. Referring to FIG. 10B, points where transmittance is close to zero are regions where the partition walls are formed and transmittance slowly starts to increase from regions that are away from the partition wall 365 by a predetermined distance. In this case, the points at which transmittance start to increase are about 3.0 um from the center of the partition wall 365.

Figure 11A:
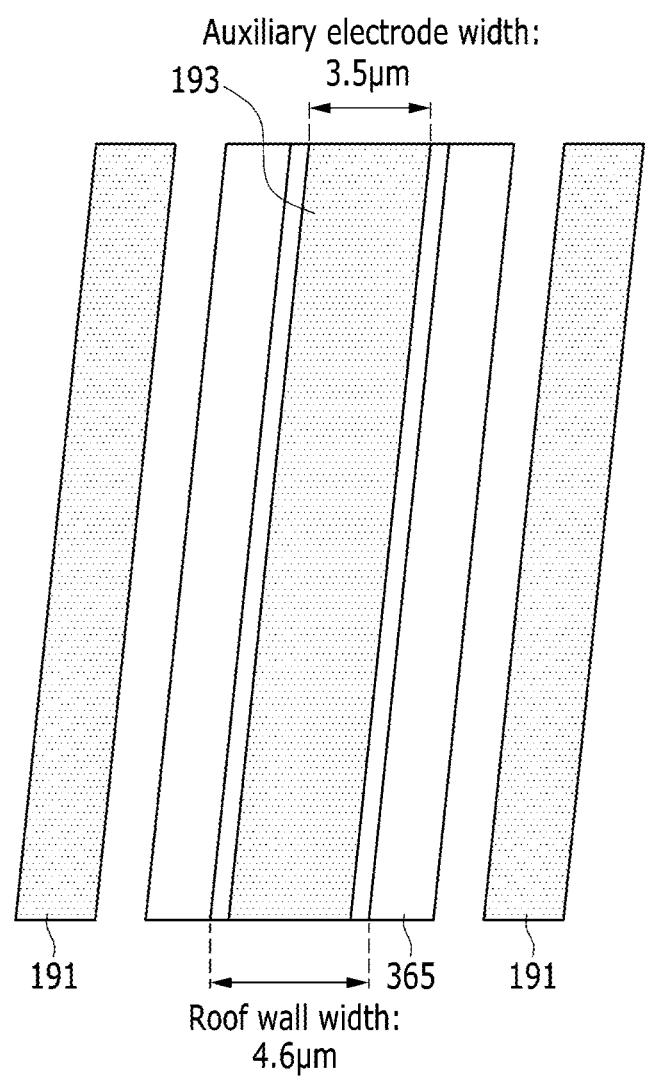
FIG. 11A illustrates a layout view of the display device according to the exemplary embodiment of the present inventive concept viewed from the bottom.
Figure 11B:
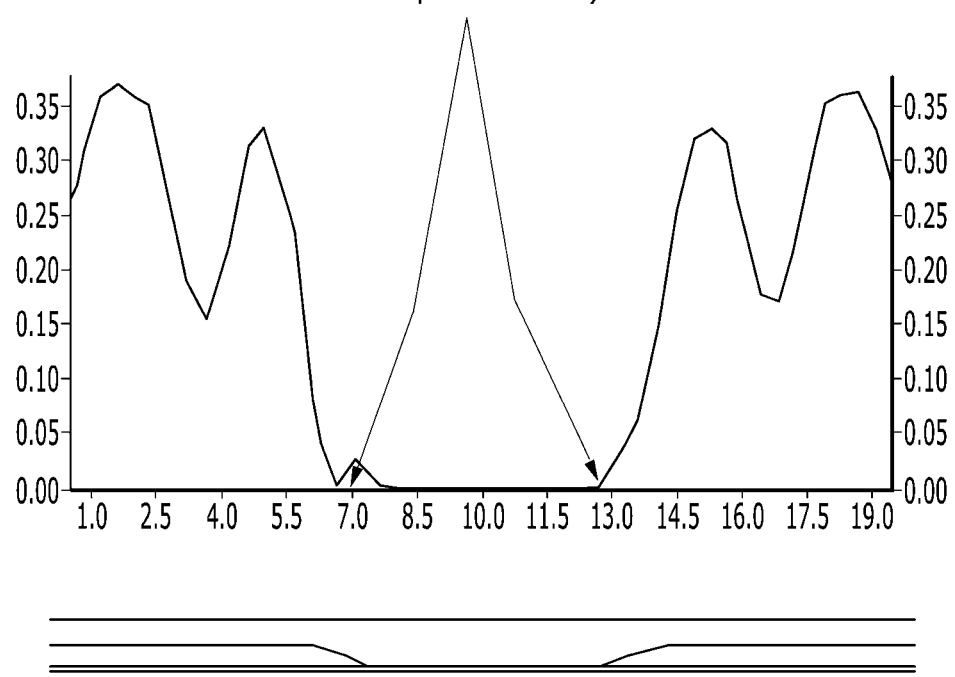
FIG. 11B illustrates measurement results of transmittance of the display device.

FIG. 11A illustrates a layout view of the display device according to the exemplary embodiment of the present inventive concept viewed from the bottom, and FIG. 11B illustrates measurement results of transmittance for the display device.

Referring to FIG. 11A, the auxiliary electrode 193 is formed under the partition wall 365. A width of the auxiliary electrode 193 may be narrower than that of a bottom surface of the partition wall 365, as illustrated in FIG. 11A.

FIG. 11B shows measurement results of transmittance in the display device of FIG. 11A. Referring to FIG. 11B, transmittance is measured close to zero in regions where the partition walls 365 are formed, and slowly increases from regions where the partition wall are not formed. Referring to FIG. 11B, points at which transmittance starts to increase are about um from the center of the partition wall 365, which are the same points as in the comparative example.

However, when FIG. 11B and FIG. 10B are compared, in the case of the display device of the present inventive concept, a small peak in transmittance is formed in a region around an end of the partition wall. That is, an additional electric field is generated even at the edge of the microcavity around the partition wall by the auxiliary electrode 193, and the liquid crystals are more favorably aligned at the edge of the microcavity around the partition wall due to the additional electric field, thereby having a better transmittance. Accordingly, since a transmittance loss due to the reduced thickness of the microcavity can be compensated by the additional electric field that is generated by the auxiliary electrode, the transmittance peak is shown even at the edge of the microcavity.

Accordingly, the display device according to the exemplary embodiment of the present inventive concept has a higher transmittance around the partition wall than the comparative example of the present inventive concept, and as a result, overall transmittance increases.

Figure 12A:
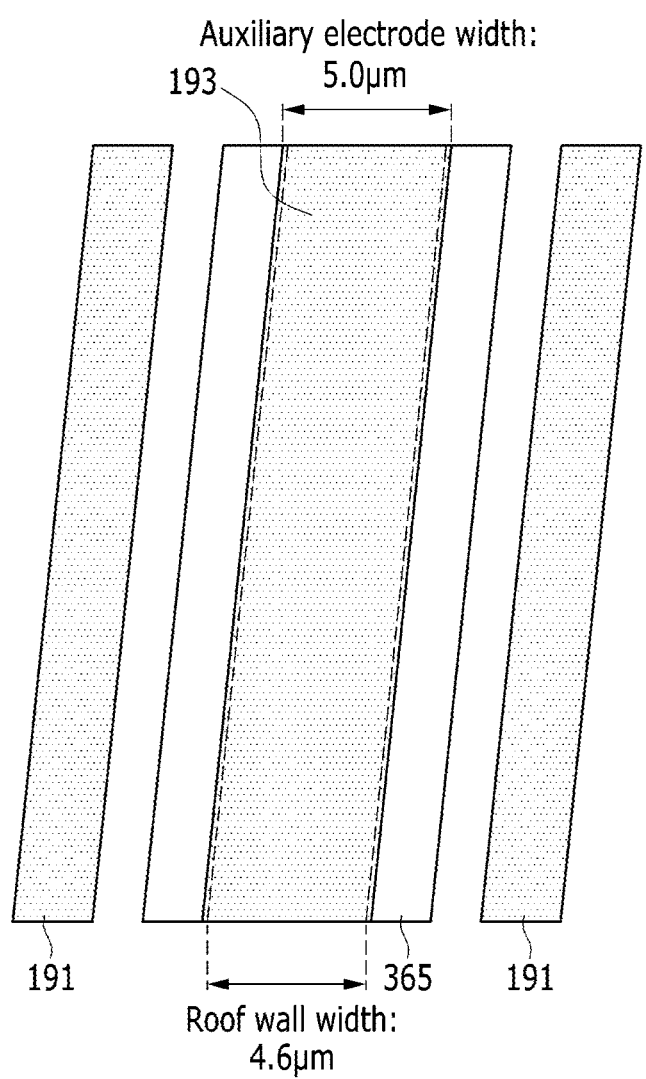
FIG. 12A is a layout view of a display device according to another exemplary embodiment of the present inventive concept viewed from the bottom.
Figure 12B:
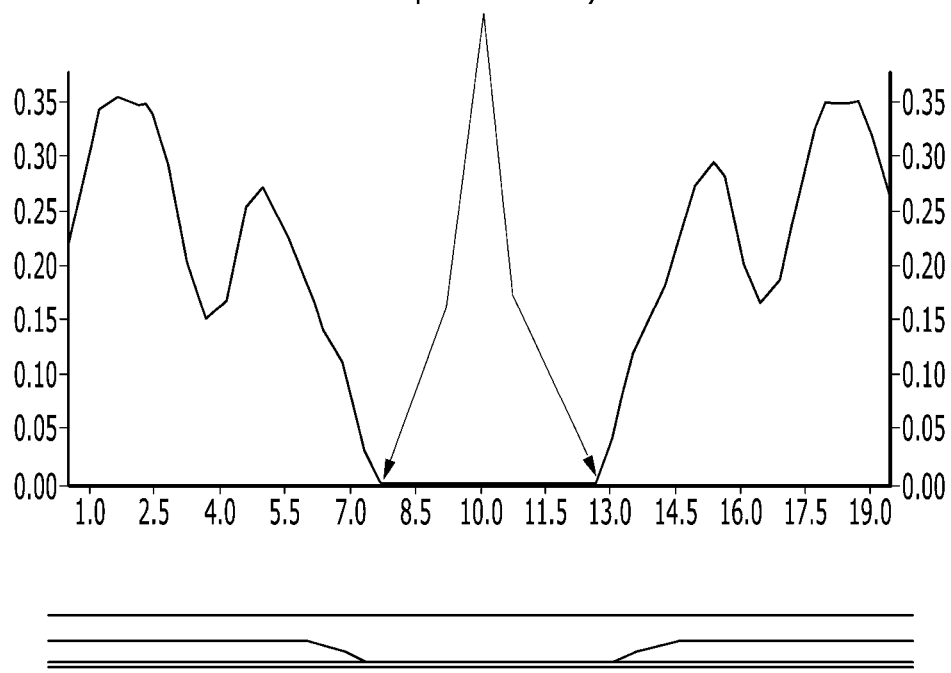
FIG. 12B illustrates measurement results of transmittance of the display device.

FIG. 12A is a layout view of a display device according to another exemplary embodiment of the present inventive concept viewed from the bottom, and FIG. 12B illustrates measurement results of transmittance for the display device.

Referring to FIG. 12A, the auxiliary electrode 193 is formed under the partition wall 365. A width of the auxiliary electrode 193 may be formed wider than that of the bottom surface of the partition wall 365, as shown in FIG. 12A. The auxiliary electrode 193 may completely overlap a width direction of the bottom surface of the partition wall 365.

FIG. 12B illustrates transmittance measured in the display device having a structure of FIG. 12A. Referring to FIG. 12B, transmittance is measured close to zero in regions where the partition walls 365 are formed, and slowly increases from regions where partition walls are not formed.

In this case, since points at which transmittance starts to increase are about 2.5 um from the center of the partition wall 365, it can be seen that the points at which the transmittance starts to increase occur earlier than in FIG. 10A and FIG. 11B. That is, an area showing zero transmittance is smaller than in FIG. 10B and FIG. 11B. As previously described, since the auxiliary electrode 193 is formed such that it has a wider width than that of the bottom surface of the partition wall 365, an additional electric field is generated at the edge of the microcavity.

That is, the microcavity adjacent to the partition wall has a smaller thickness at its edge than at its center because of the inclined lateral surface of the partition wall, and such a difference in thickness causes transmittance to deteriorate at the edge. In the display device, the microcavity (i.e., the liquid crystal layer) is formed to have a calculated thickness for optimizing transmittance, but it deviates from such an optimal thickness. However, as previously described, in the display device according to the exemplary embodiment of the present inventive concept, since the auxiliary electrode 193 is formed at the edge of the microcavity, transmittance deterioration associated with the reduced thickness can be compensated by the additional electric field that is generated in the liquid crystal layer disposed at the edge.

Accordingly, as illustrated in FIG. 12B, it can be seen that points at which transmittance starts to increase occur earlier and overall transmittance is high.

Figure 13A:
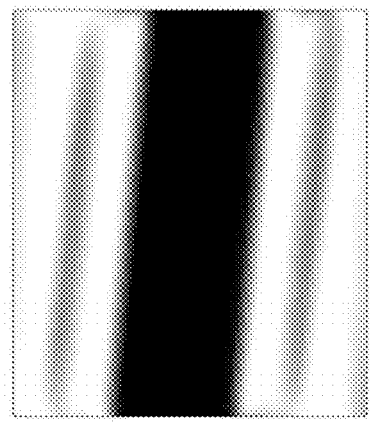
FIGS. 13A, 13B, and 13C are images of transmittances measured for the display devices of FIGS. 10A, 11A, and 12A, respectively.
Figure 13B:
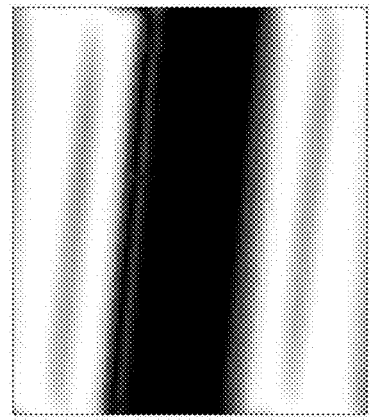
Figure 13C:
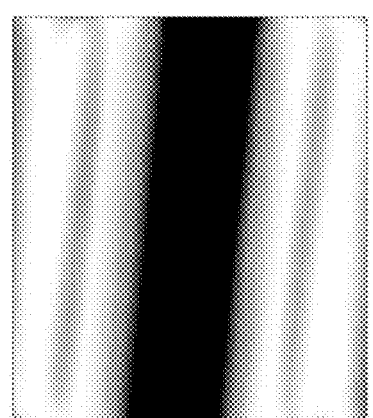

FIGS. 13A, 13B, and 13C are images of measured transmittance for the display devices of FIGS. 10, 11, and 12. FIG. 13A is the image of transmittance measured for the display device of FIG. 10 according to the comparative example of the present inventive concept, FIG. 13B is the image of transmittance measured for the display device of FIG. 11, and FIG. 13C is the image of transmittance measured for the display device of FIG. 12.

Referring to FIG. 13, when viewed from A to C, a dark region in the center of the FIGs gradually decreases. That is, the auxiliary electrode is formed to minimize a decrease in transmittance around the partition wall. Accordingly, the overall transmittance of the display device can be increased.

When transmittance measurement results illustrated in FIG. 13 are digitized, as in the comparative example of the present inventive concept of FIG. 13A, a ratio of an area showing transmittance of 5% or more is 67.13%. However, in the exemplary embodiment of the present inventive concept of FIG. 13C, a ratio of an area showing transmittance of 5% or more is 69.45%, which is higher than that of the comparative example. In addition, when comparing the overall transmittance, the comparative example of the present inventive concept of FIG. 13A shows an overall transmittance of 0.1754, but the exemplary embodiment of the present inventive concept of FIG. 13C has an improved overall transmittance of 0.1760.

As described above, in the display device according to the exemplary embodiment of the present inventive concept, by forming the auxiliary electrode under the partition wall between the microcavities, the decrease in transmittance at the edge due to the reduced thickness of the microcavity is compensated for, and thus transmittance is increased.

A display device according to another exemplary embodiment of the present inventive concept will now be described with reference to FIGS. 14 to 19. The display device according to the current exemplary embodiment has practically the same components as the display devices that are described above. A detailed description of the same or similar components will be omitted.

The display device according to the current exemplary embodiment also has the same structure as in FIG. 1. That is, as previously described, the display device has a structure including microcavities and a roof layer that covers the microcavities, and a liquid crystal layer is formed inside the microcavities.

However, in the case of the display device according to the current exemplary embodiment, one pixel has a different structure from that of the aforementioned exemplary embodiment.

Figure 14:
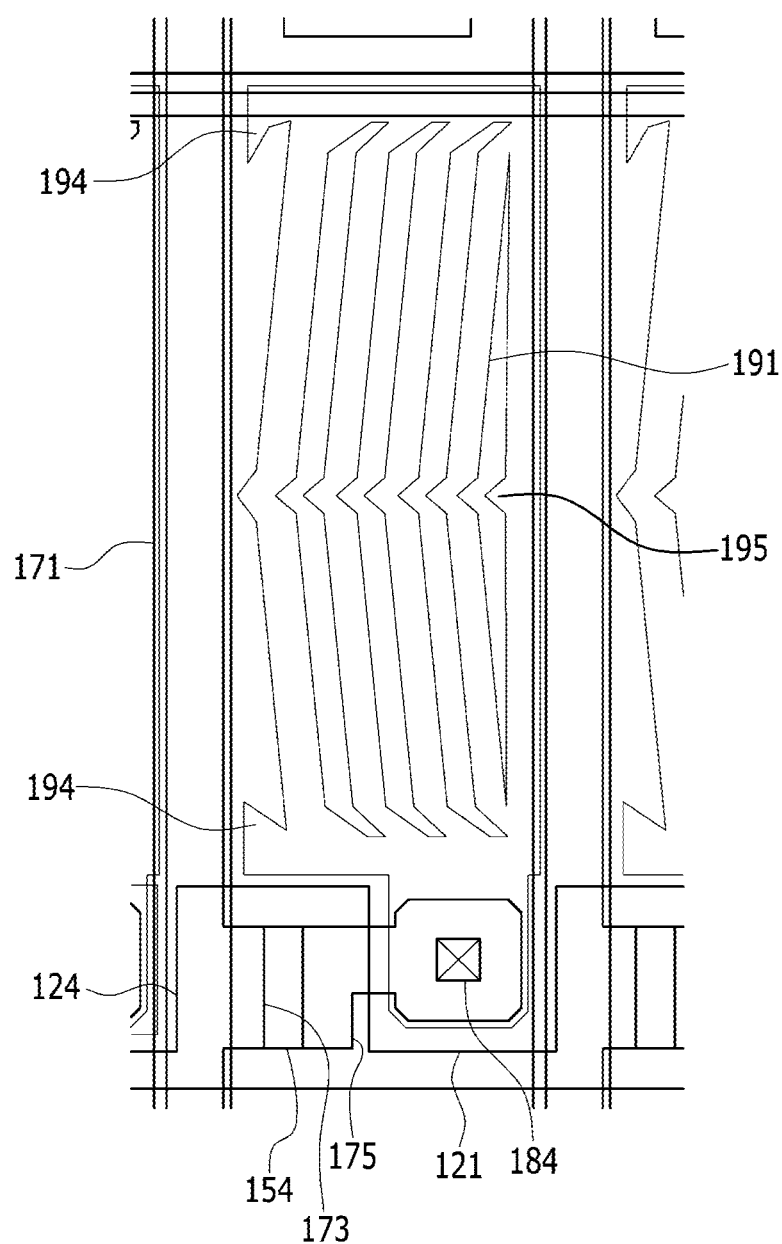
FIG. 14 illustrates one pixel in the display device according to the exemplary embodiment of the present inventive concept.

FIG. 14 illustrates one pixel in the display device according to the exemplary embodiment of the present inventive concept. In this exemplary embodiment, a data line 171 is not curved, but is formed to be straight. That is, in FIG. 2 described above, the data line 171 is curved at the predetermined angle and therefore the partition wall is also curved according to the shape of the data line 171. An imaginary line connecting four respective corners of the pixel electrode may have a rectangular shape, and the pixel electrode is completely included within the imaginary rectangle.

However, referring to FIG. 14, the data line 171 is not curved, but is formed to be straight. Accordingly, the partition wall 365 is also formed straight on the data line 171. Since the data line is formed to be straight, a distance between the pixel electrode and the data line is not the same as previously, the pixel electrode of the present inventive concept includes auxiliary protruding portions 194 and 195 to solve this problem.

Referring to FIG. 14, at the left side of the pixel electrode, since the data line is formed to be straight, a distance between a center part of the pixel electrode and the data line is not the same as a distance between opposite ends of the pixel electrode and the data line. Accordingly, in order to solve this problem, the terminal end protruding portions 194 are formed at opposite ends of the pixel electrode. The distance between the end of the pixel electrode and the data line is constantly maintained across the entire region by these terminal end protruding portions.

Similarly, referring to FIG. 14, at the right side of the pixel electrode, since the data line is formed to be straight, the distance between the center part of the pixel electrode and the data line is not the same as that between the opposite ends of the pixel electrode and the data line. Thus, in order to solve this problem, the center protruding portion 195 is formed near a center of the pixel electrode. As a result of the center protruding portion, the distance between the pixel electrode and the data line remains constant across the entire region.

Figure 15:
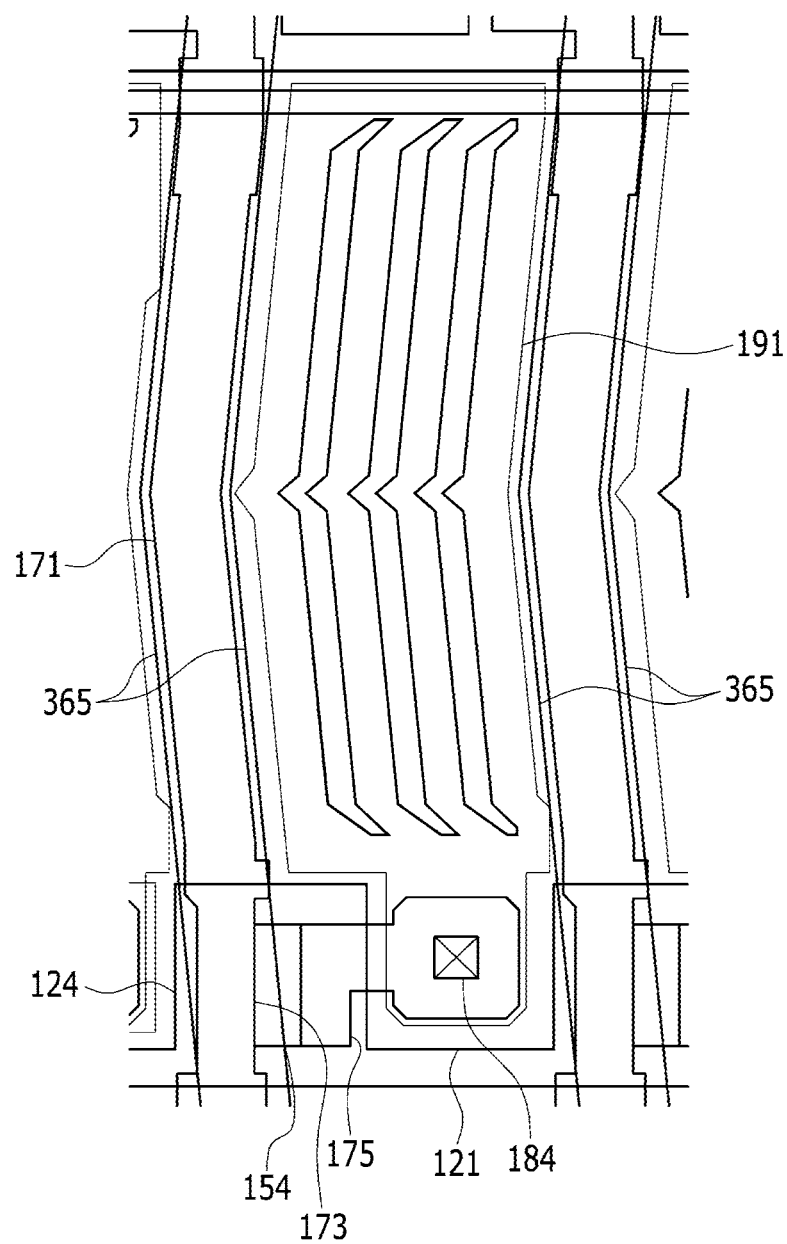
FIG. 15 illustrates one pixel in the display device according to the comparative example of the present inventive concept.

FIG. 15 illustrates a display device according to a comparative example of the present inventive concept. Referring to FIG. 15, in the display device according to the comparative example of the present inventive concept, a data line 171 is curved along a pixel electrode at a center of a pixel area, and so is a partition wall 365 at the same angle as the data line.

That is, in the display device where the data line and the partition wall are curved as shown in FIG. 15, an alignment layer inside microcavities is aligned only in a vertical direction. Accordingly, the vertical alignment does not cause any problem at the center of the pixel electrode, but at an edge where the partition wall is located, vertical alignment control and alignment of the liquid crystals which are inclined in the same direction as the partition wall conflict with each other. Accordingly, the liquid crystals are not aligned in desired directions, but in different directions therefrom, and such misalignment of the liquid crystals is recognized as light leakage.

Figure 16A:
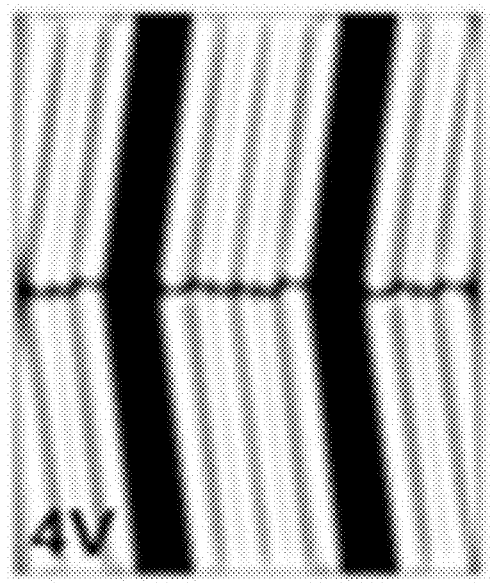
FIGS. 16A and 16B illustrate images in white and black states when voltages are applied to the display device according to the comparative example of the present inventive concept. A digit shown in FIG. 16B illustrates a digitized value of light leakage.
Figure 16B:
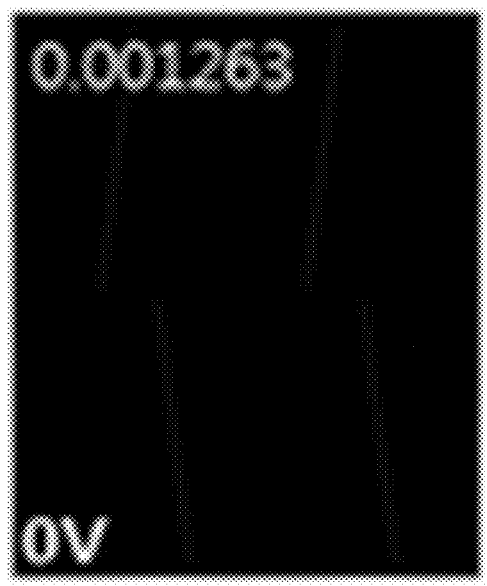

FIGS. 16A and 16B illustrate images in white and black states when voltages are applied to the display device according to the comparative example of the present inventive concept. A digit shown in FIG. 16B is a digitized representation of the light leakage.

As previously described, when the data line and the partition wall are curved as shown in FIG. 16A, the alignment direction of the alignment layer and the curved part of the partition wall conflict with each other, thereby generating light leakage around the partition wall. The digitized value of the generated light leakage is 0.001263, as illustrated in FIG. 17B.

However, in the display device of the present inventive concept according to the exemplary embodiment, the data line and the partition wall are formed to be straight to solve such a problem.

Figure 17A:
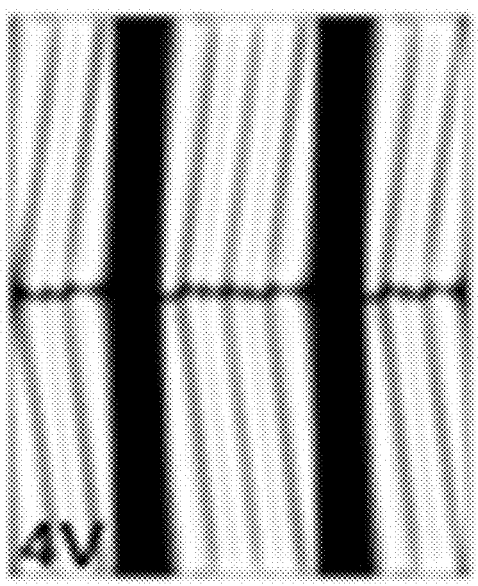
FIGS. 17A and 17B illustrate images in white and black states when voltages are applied to the display device according to the exemplary embodiment of the present inventive concept. A digit shown in FIG. 17B illustrates a digitized value of light leakage.
Figure 17B:

FIGS. 17A and 17B illustrate images in white and black states when voltages are applied to the display device according to the exemplary embodiment of the present inventive concept. A digit shown in FIG. 17B is a digitized representation of the light leakage.

When the data line is not curved and the partition wall is not curved, as shown in FIG. 17B, conflict does not occur since the alignment direction of the alignment layer inside the microcavity coincides with a forming direction of the partition wall which has the same extending direction as the data line. Accordingly, the light leakage generated around the partition wall can be prevented.

This can be verified by FIG. 17B. The digitized value of 0.000987 shown in FIG. 17B verifies that light leakage is significantly decreased, compared to the value of 0.001263 in FIG. 16B of the comparative example of the present inventive concept.

Figure 18:
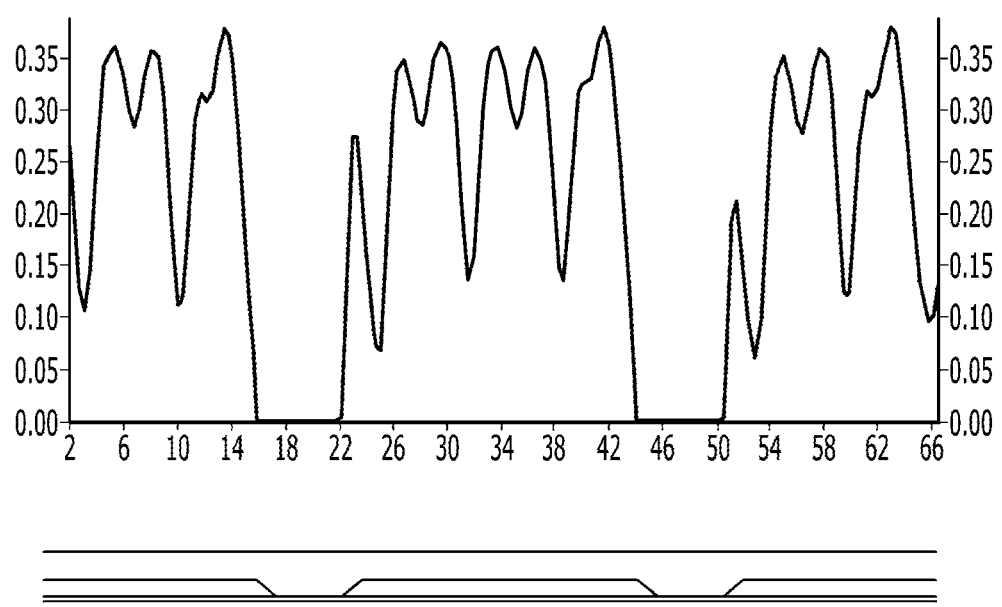
FIG. 18 illustrates transmittance measured for each region of the comparative example of the present inventive concept (where a data line and the partition wall are bent).
Figure 19:
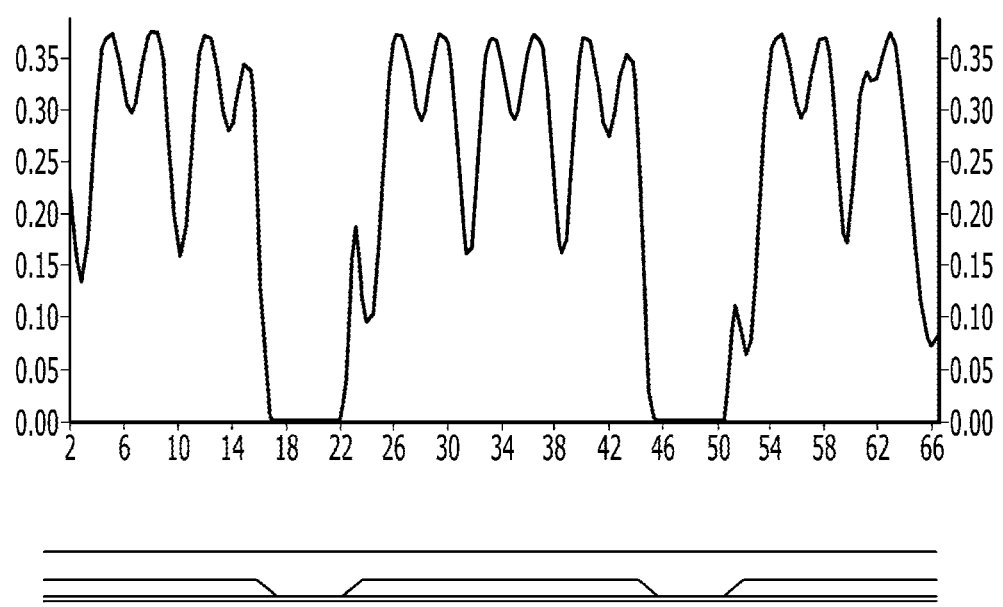
FIG. 19 illustrates transmittance measured for each region of the display device according to the exemplary embodiment of the present inventive concept (where a data line and a partition wall are formed straight).

FIG. 18 illustrates transmittance measured for each region of the comparative example of the present inventive concept (where the data line and the partition wall are bent), and FIG. 19 illustrates transmittance measured for each region of the display device according to the exemplary embodiment of the present inventive concept (where the data line and the partition wall are formed to be straight).

In the case of FIG. 18, since the forming direction of the partition wall and the alignment direction of the alignment layer are different, the alignment of the liquid crystals vary around the partition wall, such that light leakage occurs, thereby causing transmittance to increase. That is, as shown in FIG. 18, it can be seen that a transmittance peak is observed in a region around the partition wall.

However, in the case of the exemplary embodiment of the present inventive concept of FIG. 19, since the forming direction of the partition wall coincides with the alignment direction of the alignment layer by forming the partition wall to be straight, the problem of the liquid crystals being differently aligned around the partition wall is solved. Accordingly, as shown in FIG. 19, the light leakage due to the bad alignment of the liquid crystals does not occur, so it can be seen that the transmittance peak around the partition wall is significantly lower than that in FIG. 18.

In addition, in the display device of the present inventive concept, the terminal end protruding portion 194 and the center protruding portion 195 generate the additional electric field at the edge of the microcavity, such that the reduced transmittance is compensated for by the inclined lateral surface of the microcavity.

In the case of the display device according to the comparative example of the present inventive concept, the terminal end protruding portion and the center protruding portion are not formed and the overall transmittance of the display device is 0.21048, but the overall transmittance of the display device according to the exemplary embodiment of the present inventive concept is 0.21817, so it can be seen that the transmittance increases by about 3.6%.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising:
a substrate;
a data line and a thin film transistor disposed on the substrate;
a common electrode and a pixel electrode disposed on the thin film transistor and overlapping each other by interposing an insulating layer therebetween;
a roof layer formed to be separated from the pixel electrode and the common electrode while interposing a microcavity therebetween and having an injection hole partially exposing the microcavity;
a liquid crystal layer filling the microcavity;
an overcoat formed on the roof layer to cover the injection hole and sealing the microcavity,
wherein the pixel electrode includes an auxiliary electrode that is formed on the data line, the auxiliary electrode overlapping and being insulated from the data line, and
the pixel electrode and the auxiliary electrode do not overlap with each other in a direction perpendicular to the substrate.

2. The display device of claim 1, wherein the auxiliary electrode is formed on each of two data lines at opposite edges of one pixel electrode.

3. The display device of claim 1, wherein the auxiliary electrode is formed on one data line at one edge of one pixel electrode.

4. The display device of claim 1, wherein a width of the auxiliary electrode is narrower than that of the data line.

5. The display device of claim 1, wherein a width of the auxiliary electrode is wider than that of the data line.

6. The display device of claim 2, wherein two auxiliary electrodes connected to two pixel electrodes on the single data line at opposite sides thereof are formed to be separated from each other.

7. The display device of claim 1, wherein the data line includes curved portions, and the curved portions meets each other in a middle region of a pixel area to form a V-shape.

8. The display device of claim 7, wherein the roof layer covers top and opposite lateral surfaces of the microcavity, the roof layer covering the lateral surfaces of the microcavity functions as a partition wall, and the partition wall includes a curved portion that is curved at the same angle as the data line.

9. The display device of claim 1, wherein the pixel electrode has a plurality of cutouts, and the plurality of cutouts include a first portion forming a first angle with a reference line perpendicular to the gate line and a second portion forming a second angle with the reference line, which is different from the first angle, and a plurality of branch electrodes divided by the plurality of cutouts are included.

10. A display device comprising:
a substrate;
a data line and a thin film transistor disposed on the substrate;
a common electrode and a pixel electrode disposed on the thin film transistor and overlapping each other by interposing an insulating layer therebetween;
a roof layer formed to be separated from the pixel electrode and the common electrode while interposing a microcavity therebetween and having an injection hole partially exposing the microcavity; a liquid crystal layer filling the microcavity;

an overcoat formed on the roof layer to cover the injection hole and sealing the microcavity, wherein the pixel electrode includes curved portions that meet each other in a middle region of a pixel area to form a V-shape, and the data line is formed to be straight.

11. The display device of claim 10, wherein the roof layer covers top and opposite lateral surfaces of the microcavity, and the roof layer covering the lateral surfaces of the microcavity functions as a partition wall, and the partition wall is formed to be straight in the same direction as the data line.

12. The display device of claim 10, wherein the pixel electrode includes terminal end protruding portions formed at upper and lower edges of one lateral surface of the pixel electrode, and a center protruding portion formed at a center of the other lateral surface of the pixel electrode.

13. The display device of claim 12, wherein the pixel electrode has a plurality of cutouts, and the plurality of cutouts include a first portion forming a first angle with a reference line perpendicular to the gate line and a second portion forming a second angle with the reference line, which is different from the first angle, and a plurality of branch electrodes divided by the plurality of cutouts are included.

14. The display device of claim 13, wherein an imaginary line connecting four respective corners of the pixel electrode has a rectangular shape, and the pixel electrode is completely included within the imaginary rectangle.

15. The display device of claim 14, wherein a distance between an end of the pixel electrode and the data line is constantly maintained at opposite edges of the pixel electrode.

16. The display device of claim 10, wherein an alignment layer coated inside the microcavity is included, and an alignment direction of the alignment layer and an extending direction of the data line are parallel to each other.

17. A display device comprising:
a substrate;
a data line and a thin film transistor disposed on the substrate;
a common electrode and a first pixel electrode disposed on the thin film transistor and overlapping each other by interposing an insulating layer therebetween;
a roof layer formed to be separated from the first pixel electrode and the common electrode while interposing a microcavity therebetween and having an injection hole partially exposing the microcavity, the roof layer including a partition wall formed between adjacent microcavities;
a liquid crystal layer filling the microcavity;
an overcoat formed on the roof layer to cover the injection hole and sealing the microcavity,
wherein the first pixel electrode includes a first auxiliary electrode that is formed on the data line to overlap the data line,
wherein the first auxiliary electrode overlaps the partition wall, and
the pixel electrode and the auxiliary electrode do not overlap with each other in a direction perpendicular to the substrate.

18. The display device of claim 17, wherein the partition wall has a top surface and a bottom surface, the top surface being wider than the bottom surface, and
wherein the first auxiliary electrode completely overlaps a width direction of the bottom surface.

19. The display device of claim 18, further comprising a second pixel electrode having a second auxiliary electrode and formed adjacent to the first pixel electrode with the data line interposed therebetween,
wherein the second auxiliary electrode overlaps the partition wall.

20. The display device of claim 19, wherein the first auxiliary electrode and the second auxiliary electrode are electrically disconnected from each other.

* * * * *